United States Patent
Mohylevskyy et al.

(10) Patent No.: US 12,475,378 B2
(45) Date of Patent: Nov. 18, 2025

(54) NEURAL TRANSFORMER CODE COMPLETION FOR COMMAND LINE INTERFACE

(71) Applicant: MICROSOFT TECHNOLOGY LICENSING, LLC., Redmond, WA (US)

(72) Inventors: Yevhen Mohylevskyy, Redmond, WA (US); Alexey Svyatkovskiy, Bellevue, WA (US); Roshanak Zilouchian Moghaddam, Kirkland, WA (US)

(*) Notice: Subject to any disclaimer, the term of this patent is extended or adjusted under 35 U.S.C. 154(b) by 1109 days.

(21) Appl. No.: 17/464,462

(22) Filed: Sep. 1, 2021

(65) Prior Publication Data
US 2023/0073052 A1 Mar. 9, 2023

(51) Int. Cl.
*G06N 3/088* (2023.01)
*G06F 9/451* (2018.01)
*G06N 3/04* (2023.01)

(52) U.S. Cl.
CPC .............. *G06N 3/088* (2013.01); *G06F 9/451* (2018.02); *G06N 3/04* (2013.01)

(58) Field of Classification Search
CPC ........ G06N 3/088; G06N 3/04; G06N 3/0455; G06F 9/451
See application file for complete search history.

(56) References Cited

U.S. PATENT DOCUMENTS

| 11,442,702 | B2 * | 9/2022 | Smith | G06F 40/284 |
| 2004/0117380 | A1 * | 6/2004 | Perrow | G06F 3/0237 |
| 2017/0109356 | A1 * | 4/2017 | Sawal | G06F 9/453 |
| 2017/0270091 | A1 * | 9/2017 | Singh | G06F 9/45512 |
| 2020/0272426 | A1 * | 8/2020 | Fu | G06N 7/01 |
| 2020/0311538 | A1 * | 10/2020 | Wu | G06N 3/045 |

FOREIGN PATENT DOCUMENTS

| CN | 109298993 A * | 2/2019 | ......... G06F 11/3692 |
| WO | 2020096820 A1 | 5/2020 | |

OTHER PUBLICATIONS

Devlin, et al., "BERT: Pre-training of Deep Bidirectional Transformers for Language Understanding." (Year: 2019).*
Singh, et al., "Predictive Approaches for the UNIX Command Line: curating and exploiting domain knowledge in semantics deficit data." (Year: 2020).*
Joshi, et al., "SpanBERT: Improving Pre-training by Representing and Predicting Spans" (Year: 2020).*
Svyatkovskiy, et al., "IntelliCode Compose: Code Generation using Transformer" (Year: 2020).*

(Continued)

Primary Examiner — Mariela Reyes
(74) Attorney, Agent, or Firm — Workman Nydegger (57) ABSTRACT

A code completion system for a CLI utilizes neural transformer models with attention to generate candidates to complete a line of CLI code. The code completion system uses a first deep learning model to predict at most k candidate command names to follow n immediately preceding lines of CLI code which are presented to a developer. Upon the developer accepting one of the candidate command names, the code completion system uses a second deep learning model to predict at most k parameter strings to complete the line of CLI code.

20 Claims, 7 Drawing Sheets

(56) References Cited

OTHER PUBLICATIONS

"International Search Report and Written Opinion Issued in PCT Application No. PCT/US22/036599", Mailed Date: Oct. 25, 2022, 17 Pages.

Singh, et al., "Predictive Approaches for the UNIX Command Line: Curating and Exploiting Domain Knowledge in Semantics Deficit Data", In Journal of Multimedia Tools and Applications, vol. 80, Issue 6, Nov. 9, 2020, pp. 9209-9299.

\* cited by examiner

NEURAL TRANSFORMER CODE COMPLETION FOR COMMAND LINE INTERFACE

BACKGROUND

A command line interface is a user interface in which a user enters commands in the form of a string of text characters. The command line interface is a text-based interface in which the commands are manually typed. The command line interface accepts commands in a designated input field which are then executed by a command line interpreter. This type of user interface is advantageous over a graphical user interface (GUI) where a user uses a mouse or fingers to click images of icons to access files or programs and/or to execute various operations. The command line interface is faster and more efficient than a GUI since it is composable, that is several tasks can be specified in a single text string thereby eliminating numerous interactions with the GUI.

The use of a command line interface requires a user to be familiar with the commands supported by the command line interface and the correct syntax of the commands The availability of good reference documentation for the commands may be limited and may change dynamically. This is often a problem when there are a large number of commands with various sub-commands and parameters which may be used in numerous ways.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A code completion system for a command line interface (CLI) utilizes neural transformer models with attention to generate candidates to complete a line of CLI code. The code completion system uses a first deep learning model to predict at most k candidate command names to follow n immediately preceding lines of CLI code which are presented to a developer. Upon the developer accepting one of the candidate command names, the code completion system uses a second deep learning model to predict at most k parameter strings to complete the command name into a syntactically-correct line of CLI code.

In one aspect, the first deep learning model is an encoder neural transformer model pre-trained on an unsupervised training dataset including source code programs from different programming languages and shell script languages using a masked language objective. The pre-trained encoder transformer model is then fine-tuned on a supervised training dataset of CLI code to learn to predict a command name given a CLI code snippet.

The second deep learning model is a decoder neural transformer model pre-trained on the unsupervised training dataset to autoregressively generate each token in a line of source code one time step at a time. The pre-trained decoder neural transformer model is then fine-tuned on a supervised training dataset of CLI code to learn to predict a line of CLI code to follow a given group of CLI lines of code and the true next line of code.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

A code completion system for a CLI utilizes deep learning models to predict candidates to complete a line of CLI code. The code completion system uses a first deep learning model to predict at most k candidate command names given n immediately preceding lines of CLI code which are presented to a developer (i.e., user, customer, programmer, client, etc.). Upon the developer accepting one of the candidate command names, the code completion system uses a second deep learning model to predict at most k parameter strings to complete the line of CLI code with the selected command name. A parameter string includes zero, one or more parameters of a command name, where a parameter may include a parameter value.

In one aspect, the code completion system generates one line of code at a time based on a current context of the code in the CLI. A line of CLI code may span several physical lines in a CLI. A line of CLI code refers to a syntactically-correct format of an operation of a CLI that includes a command name, which may include a subcommand, followed by zero, one or more parameters strings.

System

Figure 1:
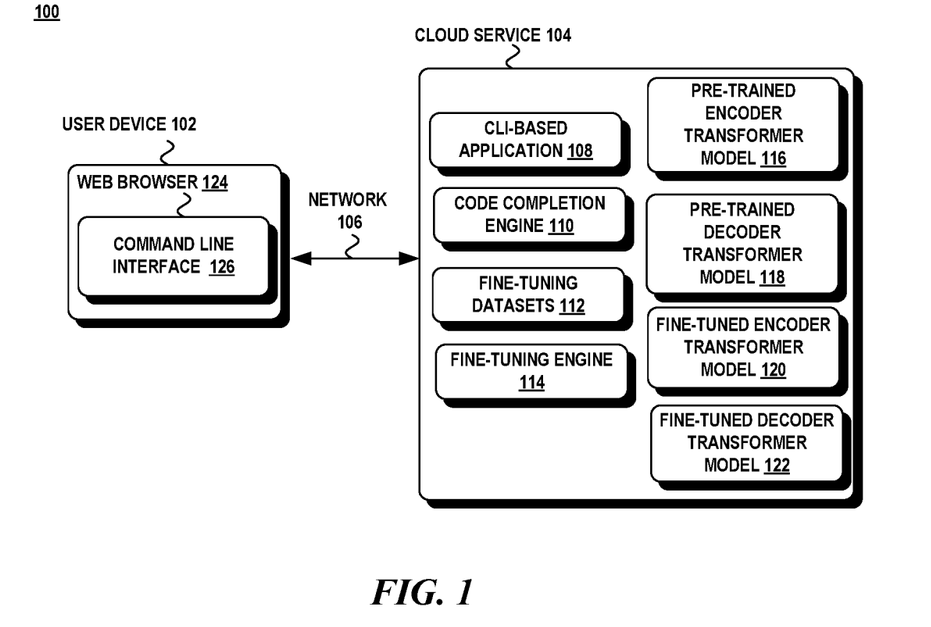
FIG. 1 is a schematic diagram illustrating examples of components of a CLI code completion system.

FIG. 1 illustrates a block diagram of an example of a system 100 in which various aspects of the invention may be practiced. As shown in FIG. 1, system 100 includes a user device 102 communicatively coupled to a cloud service 104 through a network 106. The cloud service 104 includes a number of resources (e.g., applications, virtual machines, libraries, services, databases, storage, etc.) that are made available to one or more user devices 102 through the network 106. The cloud service 104 is composed of one or more servers. Examples of a cloud service include Microsoft Azure, Google Cloud, and the like.

A user device 102 includes a web browser or rich client application 124 that is configured to execute a command line interface 126. The command line interface 126 enables the user device 102 to access resources on the cloud service 104 through text-based commands. Commands are entered into a command prompt or input field of the CLI and transformed into Representational State Transfer (REST) Application Programming Interfaces (APIs). The REST APIs are service endpoints that support a set of HTTP operations or methods to create, retrieve, update, delete or access resources on the cloud service.

The cloud service 104 includes a CLI-based application 108, a code completion engine 110, a fine-tuning dataset 112, a fine-tuning engine 114, a pre-trained encoder transformer model 116, a pre-trained decoder transformer model 118, a fine-tuned encoder transformer model 120, and a fine-tuned decoder transformer model 122.

The CLI-based application 108 is a cloud-based application that receives commands initiated from the user device 102. In one aspect, the CLI-based application 108 may be a cloud management and deployment application. The CLI 102 may be a shell program that is executed through the web browser or rich client application 124. The CLI-based application 108 requires CLI commands entered to perform desired computer operations.

CLI commands can vary in complexity depending on their usage and the parameters required to execute the CLI commands. A CLI command includes a command name, one or more sub-commands, and/or parameters or arguments. A parameter has zero or more parameter values. Some CLI commands may require one or more input parameters which may be derived from the output of previously-executed commands.

An exemplary CLI is the Azure® command line interface for the Microsoft® Azure® cloud computing service. This cloud computing service provides various services, such as software-as-a-service (SaaS), platform-as-a-service (PaaS), and infrastructure-as-a-service (IaaS) to build, test, deploy, and manage services and applications in addition to providing different programming tools. It should be noted that the techniques described herein are not limited to this particular CLI or to a particular configuration of a CLI interface.

In order to perform an operation in the CLI-based application 108, a developer would need to know what CLI command to use, the correct format of the command, the parameters needed for the command, and the associated parameter values. The correct usage of a CLI command refers to the format of the text string of an operation that includes the command, subcommands, parameters and/or parameter values needed to execute the operation. If a required parameter is not entered with the correct parameter value, execution of the command would likely cause an error. The user would have to find the correct usage of the command and correct the error. This process would have to be repeated for each error encountered with a CLI command until every error is corrected. The code completion alleviates these errors by predicting the next syntactically-correct line of CLI code.

The code completion engine 110 generates candidates to predict a command name to follow the immediately preceding lines of CLI code and candidates to predict a parameter string to complete a predicted command name. The fine-tuning engine 114 generates supervised fine-tuning datasets 112 that are used to fine-tune the pre-trained encoder transformer model 116 into a fine-tuned encoder transformer model 120 and the pre-trained decoder transformer model 118 into a fine-tuned decoder transformer model 122. In addition, the fine-tuning engine 114 performs the fine-tuning process for both models.

The pre-trained encoder neural transformer model 116 is trained on a large unsupervised training dataset of source code of different programming languages and shell scripting languages using a masked language objective to learn embeddings of the tokens from different types of source code. The pre-trained encoder neural transformer model 116 uses bi-directional attention which enables the encoder to learn the relationships of the tokens/subtokens in an input sequence both before and after their occurrence. The pre-trained encoder neural transformer model 116 is then fine-tuned by the fine-tuning engine 114 using the fine-tuning dataset 112 into a classifier to interpret the pre-trained model's internal representation into a class label.

A pre-trained decoder neural transformer model with attention 118 is trained on a large corpus of unsupervised multi-lingual source code programs. The pre-trained decoder neural transformer model 118 is then fined-tuned by the fine-tuning engine 114 using the fine-tuning dataset 112 to generate a fine-tuned decoder transformer model 122 that learns to predict a parameter string for a given command name and context. The pre-trained decoder neural transformer model 118 is an auto-regressive model that produces each token one at a time based on the tokens output at previous time steps. The pre-trained decoder neural transformer model is then fine-tuned on CLI code to learn to complete a line of CLI code given a target command name and a context (e.g., n preceding lines of CLI code).

Attention now turns to a further description of the various neural transformer models.

Neural Transformer Architectures

Machine learning pertains to the use and development of computer systems that are able to learn and adapt without following explicit instructions, by using algorithms and statistical models to analyze and draw inferences from patterns in data. Machine learning uses different types of statistical methods to learn from data and to predict future decisions. Traditional machine learning includes support vector models, random forest models, data mining, Bayesian networks, Markov models, clustering, non-neural classification techniques, and visual data mapping. Deep learning differs from traditional machine learning since it uses multiple stages of data processing through many hidden layers of a neural network to learn and interpret the features and the relationships between the features. Deep learning embodies neural networks which differs from the traditional machine learning techniques that do not use neural networks.

Neural transformers models are one type of deep learning that utilizes an attention mechanism. Attention directs the neural network to focus on a subset of features or tokens in an input sequence thereby learning different representations from the different positions of the tokens in an input sequence. The attention mechanism provides the model with a better capability to learn the task at hand thereby generating more accurate predictions of the candidate method bodies. It should be noted that the term neural transformer model with attention and neural transformer model are used interchangeably.

Figure 2:
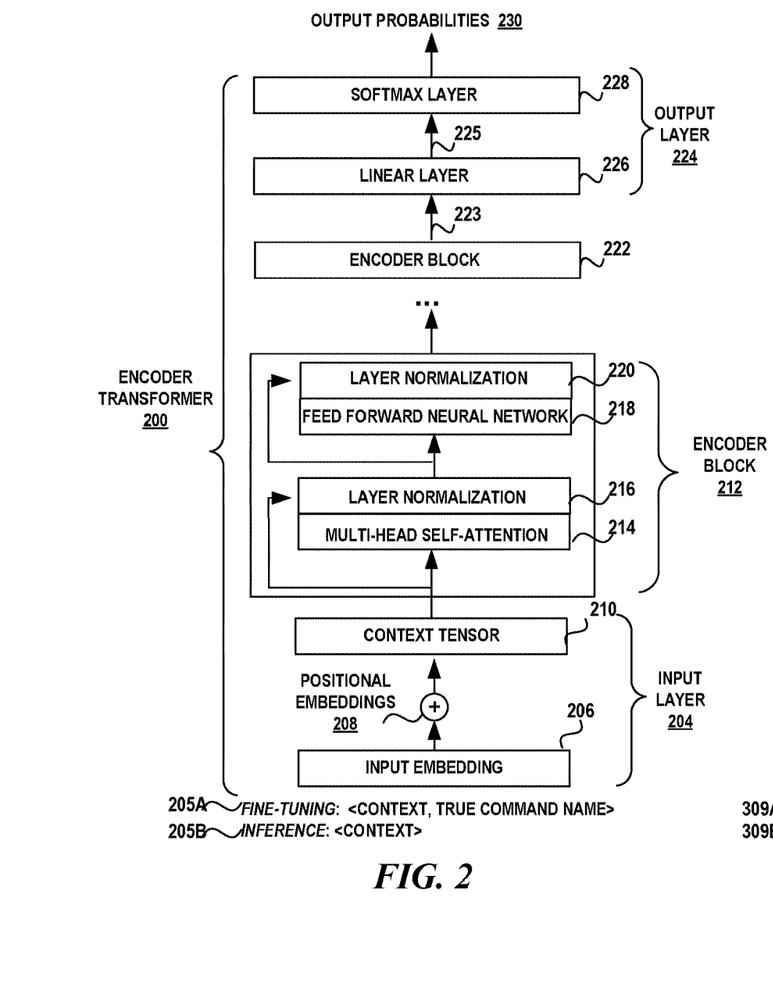
FIG. 2 is a schematic diagram illustrating an example architecture of an encoder neural transformer model with attention.
Figure 3:
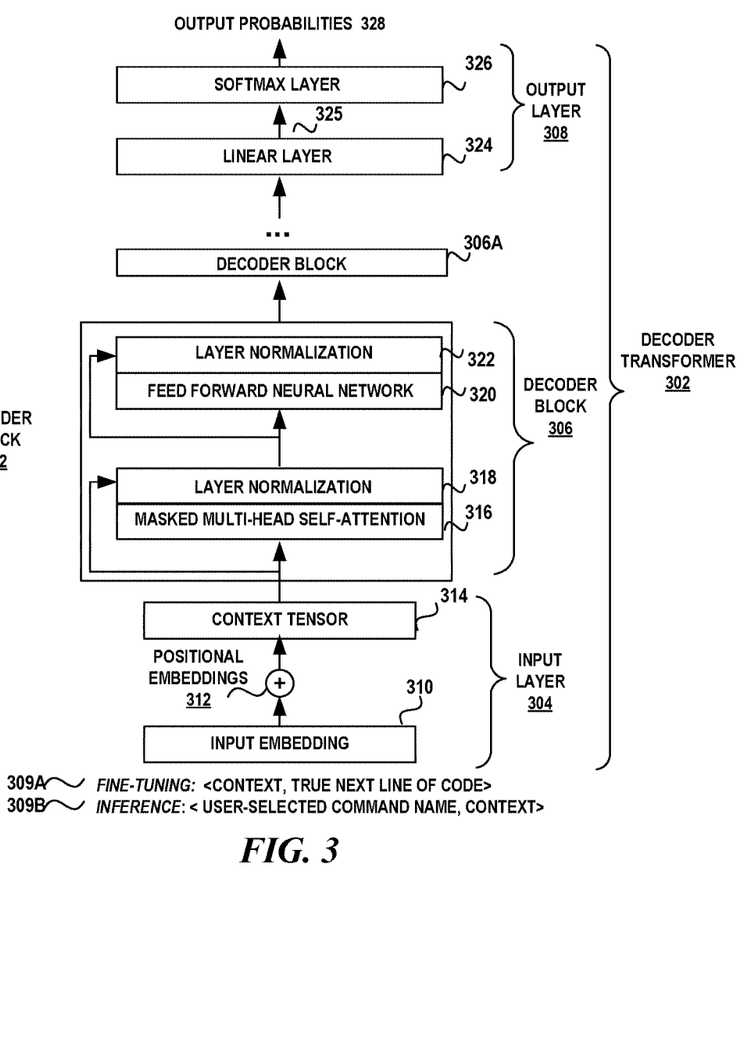
FIG. 3 is a schematic diagram illustrating an example architecture of a decoder neural transformer model with attention.

There are different configurations for a neural transformer model with attention. FIG. 2 shows an example of a configuration of an encoder neural transformer model with attention and Fig.3 shows an example of a configuration of a decoder neural transformer model with attention.

Referring to FIG. 2, the encoder neural transformer 200 includes an input layer 204, one or more encoder blocks 212, and an output layer 224. The input layer 204 includes input embeddings of an input sequence of the training dataset 206 and positional embeddings 208 that represents an order of the tokens/subtokens in an input sequence. The input embeddings 206 and the positional embeddings 208 are combined to form a context tensor 210.

An encoder block 212 consists of two layers. The first layer includes a multi-head self-attention component 214 followed by a layer normalization component 216. The second layer includes a feed-forward neural network 218 followed by layer normalization component 220. The context tensor 210 is input into the multi-head self-attention layer 214 of the encoder block 212 with a residual connection to layer normalization 216. The multi-head self-attention layer 214 is bi-directional which allows the model's internal representation to depend on all other tokens, and not just the previous tokens.

The output of the layer normalization 216 is input to the feed forward neural network 218 with another residual connection to layer normalization 220. The output of each encoder block is a set of hidden representations. The set of hidden representations are then sent through additional encoder blocks, if multiple encoder blocks exist.

Attention is used to decide which parts of the input sequence are important for each token/subtoken, especially when decoding long sequences since the encoder is limited to encoding a fixed-size vector. Attention mechanisms gather information about the relevant context of a given token/subtoken and then encode that context into a vector which represents the token/subtoken. It is used to identity the relationships between tokens in the long sequence while ignoring other subtokens that do not have much bearing on a given prediction. The multi-head self-attention layer 214 is bi-directional thereby giving the transformer greater power to encode multiple relationships and nuances for each token.

The multi-head self-attention component 214 takes a context tensor 210 and weighs the relevance of each token/subtoken represented in the context tensor to each other by generating attention weights for each token/subtoken in the input embedding 206. In one aspect, the attention function is scaled dot-product attention which is described mathematically as follows:

$$\text{Attention}(Q, K, V) = \text{softmax}\left(\frac{QK^T}{\sqrt{d_k}}\right)V,$$

where the input consists of queries Q and keys K of dimension $d_k$, and values V of dimension $d_v$. Q is a matrix that contains the query or vector representation of one token/subtoken in a sequence, K is the vector representations of all tokens/subtokens in the sequence, and V is the vector representations of all the tokens/subtokens in the sequence.

The queries, keys and values are linearly projected h times in parallel with $d_v$ output values which are concatenated to a final value:

MultiHead($Q$, $K$, $V$)=Concat(head$_1$, . . . , head$_h$) $W^o$, where head$_i$=Attention($QW_i^Q$, $KW_i^K$, $VW_i^V$), with parameter matrices $W_i^Q \in \mathbb{R}^{d_{model} \times d_k}$, $W_i^K \in \mathbb{R}^{d_{model} \times d_k}$, $W_i^V \in \mathbb{R}^{d_{model} \times d_k}$, and $W^O \in \mathbb{R}^{hd_v \times d_{model}}$.

In order to reduce the training time of the neural transformer, layer normalization is used between the layers. The layer normalization component normalizes the inputs across the features. The mean and standard deviation is computed across the feature dimensions. There is a first layer normalization 216 that precedes the feed forward neural network 218 and a second layer normalization 220 that follows the feed forward neural network 218. The feed-forward neural network 218 processes each output encoding separately. The output of the top encoder block 222 is a set of attention vectors K and V 223 that represent the last hidden layer.

The configuration of the pre-trained encoder neural transformer model includes the input layer 204 and one or more encoder blocks 212. The output layer 224 is not part of the pre-trained encoder neural transformer model. The pre-trained encoder neural transformer model is trained to learn token embeddings from a variety of source code programs and other shell script programs. The pre-training of the pre-trained encoder neural transformer model initializes the model with pre-trained parameters (token embeddings, positional embeddings, attention weights and biases).

The configuration of the fine-tuned encoder neural transformer model includes the input layer 204, the encoder blocks 212, 222 and the output layer 224. The output layer 224 is attached to the last encoder block 222 and is used to relate a token embedding to a class label. The output layer 224 consists of a linear layer 226 and a softmax layer 228. The linear layer 226 is a fully-connected neural network that projects the raw scores output by the last layer of the encoder block 223 into a logits vector 225. The linear layer 226 adjusts the relationship between the inputs and the outputs, such as adjusting the relationship between a token embedding to a class label. The softmax layer 228 applies a softmax function to the logits vector 225 to compute output probabilities 230 that represent the probability distribution of the class labels. The class labels are the command names of the commands that exist in the target CLI.

The pre-trained configuration of the encoder neural transformer model is fine-tuned using a first fine-tuning dataset that includes input sequences 205A where each input sequence includes a context and a true command name. The context includes a number of lines of CLI code immediately preceding a position in the CLI where code completion is needed. The input sequence is then tokenized and each token is replaced with a corresponding token embedding in the input embedding 206 and an embedding representing its position in the sequence in the positional embedding 208. During inference, the input sequence 205B includes a current context in the CLI or the n immediately preceding lines of CLI code from a target position in the CLI where code completion is needed.

Attention now turns to a description of the decoder neural transformer model.

Decoder

Turning to FIG. 3, there is shown an example of a configuration of a decoder neural transformer model 302.

The decoder neural transformer model 302 includes an input layer 304, one or more decoder blocks 306, 306A, and an output layer 308. A decoder block 306 consists of two layers. The first layer includes a masked multi-head self-attention component 316 followed by a layer normalization component 318. The input to the masked multi-head self-attention component 316 has a residual connection to layer normalization 318. The output of layer normalization 318 is input into the feed forward neural network 320 with a residual connection to layer normalization component 322. The output of the feed forward neural network is input into layer normalization component 322.

Each token/subtoken flows through all the decoder blocks along its own path. The masked multi-head self-attention component 316 allows the neural network 320 to focus on certain features or inputs. The inputs 310 to the first decoder block 306 are added with the positional embeddings 312 forming context tensor 314. Each decoder block 306 predicts each token/subtoken $t_i$ in the target language one-by-one at each time step conditioned on all previously-generated target tokens/subtokens $t_1, \ldots t_{i-1}$.

The masked multi-head self-attention component 316 masks the output embeddings from future time steps. The feed-forward neural network 320 processes each output embedding separately. A layer normalization component 318, 322 is used between the layers in order to normalize the inputs across the features.

The linear layer 324 is a fully-connected neural network that projects the raw scores output by the last decoder block 306A into a logits vector 325. The softmax layer 326 applies a softmax function to the logits vector 325 to compute the output probabilities 328. The output probabilities 328 represent the probability distribution of the tokens in the model's vocabulary.

The pre-trained configuration of the decoder neural transformer model is fine-tuned using a second fine-tuning dataset including input sequences 309A where each input sequence has a context and the next line of CLI code that immediately follows the context (i.e., true next line of code). The context includes a number of lines of CLI code preceding the true next line of code. The input sequence is then tokenized and each token is replaced with a corresponding token embedding in the input embedding 310 and an embedding representing its position in the sequence in the positional embedding 312. During inference, the input sequence 309B includes a user-selected command name and the context or n immediately preceding lines of CLI code from a target position in the CLI.

Attention now turns to a description of an example of a method for training the neural transformer models.

Training

Figure 4:
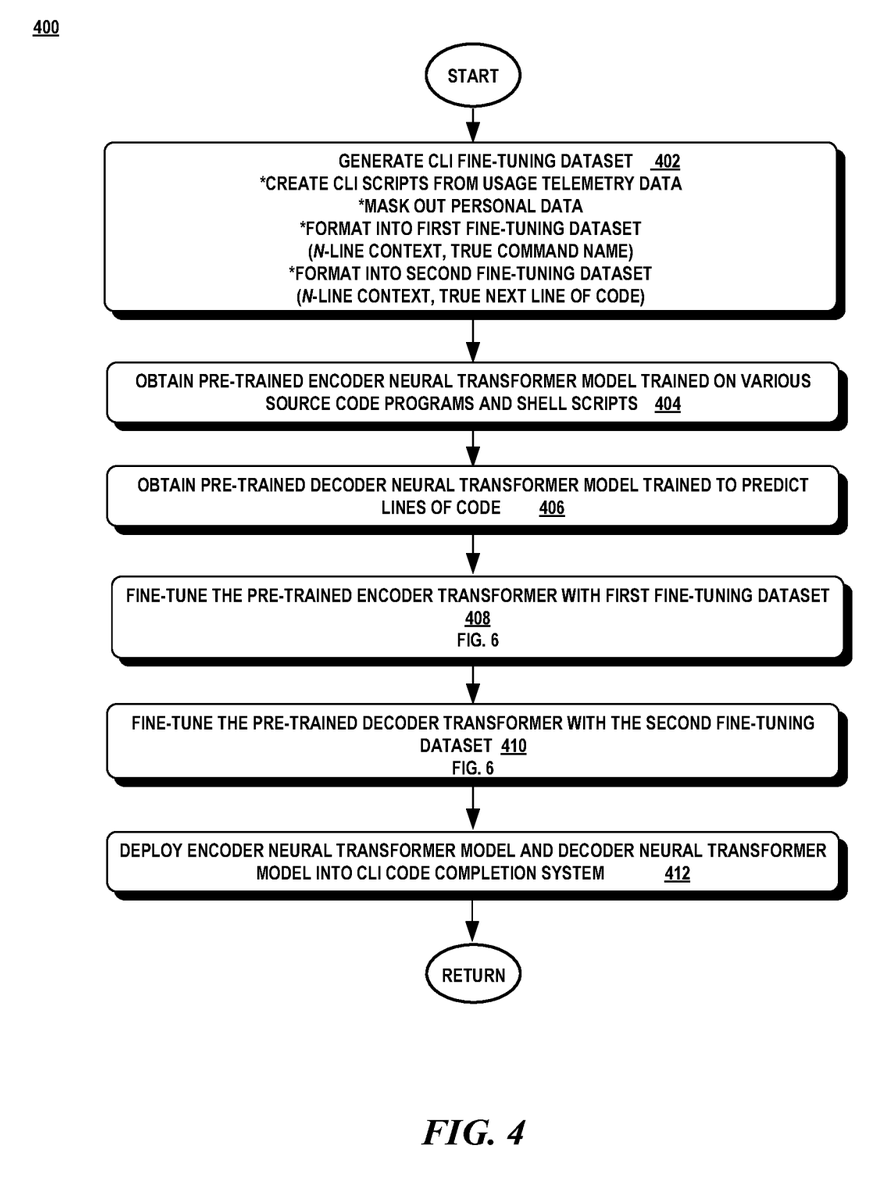
FIG. 4 is a flow diagram illustrating an example of a method for generating the encoder neural transformer model with attention and the decoder neural transformer model with attention.

Turning to FIG. 4, the fine-tuning engine 114 generates a fine-tuning dataset 112 which is used to fine-tune previously trained models for an intended task. The fine-tuning dataset 112 consists of a number of consecutive lines of CLI code and the command name that immediately follows. The data for the fine-tuning dataset 112 is extracted from usage telemetry data of the target CLI. The usage telemetry data contains a raw, unedited listing of commands executed by the CLI application by different users. The fine-tuning engine 114 groups the telemetry data by time, user, and session identifier in order to generate a CLI script having an ordered sequence of successfully-executed commands by a same user during a same user session. The parameter values used in the parameters of the commands are masked out with a masking character "***" in order to preserve the user's privacy. In some cases, the parameter values may include personal identifiable data. The fine-tuning dataset 112 is formatted into tuples that include a set of lines immediately preceding a command and the command name of the command immediately following the set of preceding lines of code. (Collectively, block 402)

Figure 5:
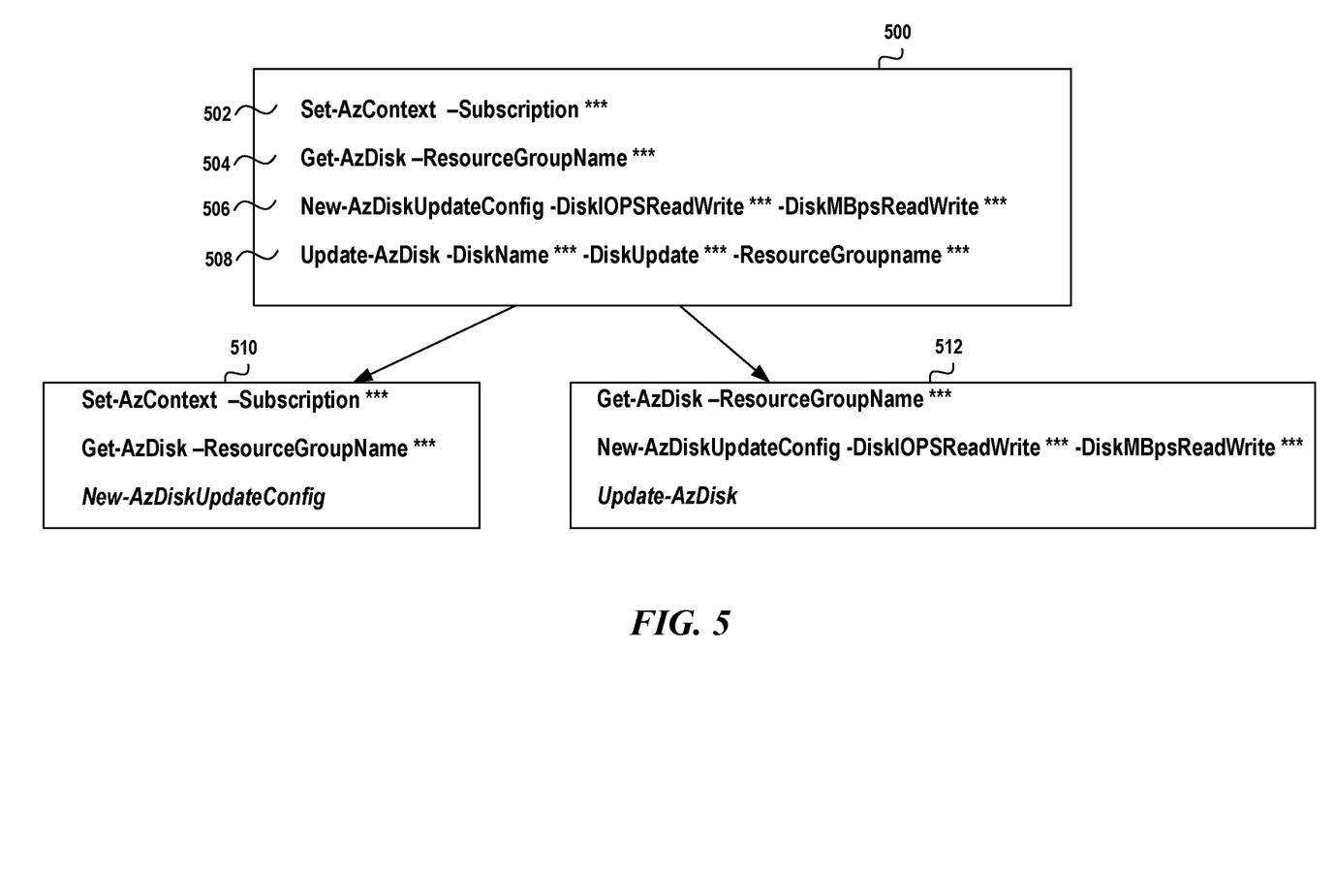
FIG. 5 is a schematic diagram illustrating an example of a construction of the fine-tuning dataset.

A sample CLI script 500 is shown in FIG. 5. The script updates an Azure Disk configuration. The first command, Set-AzContext -Subscription *, sets the correct subscription identifier. The second command, Get-AzDisk -ResourceGroupName *, displays the current disk information. The third command, New-AzDiskUpdateConfig -DiskIOPSReadWrite * -DiskMBpsReadWrite *, creates a new disk configuration, and the last command, Update-AzDisk -DiskName * -DiskUpdate * -ResourceGroupname ***, updates the current configuration to the new configuration.

The command name is the first element of each line of code. The parameter names are preceded with a "-" character name and the parameter values are masked out with the "***" characters. The first line of the script 502 contains the command name Set-AzContext with the parameter Subscription and its parameter value masked out. The second line of the script 504 contains the command name Get-AzDisk with the parameter ResourceGroupName with the parameter value masked out. The third line of the script 506 includes the command name New-AzDiskUpdateConfig with the parameters DiskIOPSReadWrite and DiskMBpsReadWrite having masked out parameter values. The last line of the script 508 includes the command Update-AzDisk with parameters DiskName, DiskUpdate, ResourceGroupName with masked out parameter values.

From this script, two training sequences are generated 510, 512 when the context is configured to include two preceding lines of CLI code. A training sequence includes the context and a command name. Sequence 510 consists of the two lines of code that immediately precede the lines of code having the command name New-AzDiskUpdateConfig in the script and the command name New-AzDiskUpdateConfig. Sequence 512 consists of the two lines of code that immediately precede the command name Update-AzDisk in the script and the command name Update-AzDisk.

Turning back to FIG. 4, a pre-trained encoder neural transformer model is obtained. Alternatively, the encoder neural transformer model may be generated in the same manner as an existing pre-trained encoder neural transformer model as follows. The pre-trained encoder neural transformer model is one that has been trained to learn source code. In one aspect, the pre-trained encoder neural transformer model is trained to learn token encodings for tokens from a diverse corpus of unlabeled source code programs or files. This is referred to as unsupervised learning since the model draws inferences from the input data without labeled input. The selected source code files come from various source code repositories. The source code files contain context beyond method bodies, method signatures, and docstrings, such as imports, globals, comments, and scripts. (Collectively, block 404).

Each of the selected source code files is parsed into a concrete syntax tree and a tokenizer is used to extract tokens/subtokens from the concrete syntax tree. In one aspect, a Byte-level Byte-Pair Encoding tokenizer to generate subtokens to represent ordered sequences of CLI training dataset. Byte-level byte-pair encoding (BBPE) is used to generate the vocabulary used by a neural transformer model. A text string, either a sequence of source code or a natural language text, is represented as a sequence of Unicode Transform Format, UTF-8 bytes. The input text string of subtokens is encoded as a sequence of UTF-8 bytes, where a subtoken is encoded into one to four bytes. A byte sequence is then partitioned into byte-level subwords, referred to as byte n-grams. The ordered sequences of UTF-8 bytes are translated into a T-ordered sequence of tokens/subtokens which are vector representations of a source code fragment. The T-ordered sequence of tokens/subtokens are represented in a context vector. (Collectively, block 404).

A noising transformation, such as a span masking function, is then applied to each sequence that randomly masks out a subset of tokens/subtokens and the masked span of tokens/subtokens is replaced with a mask subtoken, M. The encoder neural transformer model is trained with the masked sequences to learn to reconstruct the original sequence without the masked tokens/subtokens. In one aspect, the mask subtoken replaces a span of tokens/subtokens. The number of text spans and the span lengths are randomly generated and each span is replaced with a single mask subtoken. The masked denoising is based on the doze task of evaluating human language-learners' proficiency, in which humans are given a foreign language with missing words, and are asked to correctly choose the missing word. The benefit of span-masking denoising in pre-training is that the model learns the desired language in an unsupervised fashion, but also is bi-directional in the sense that it learns the relationships of words both before and after their occurrence. (Collectively, block 404).

A pre-trained decoder neural transformer model is obtained that was trained to autoregressively predict lines of source code one token at a time. Alternatively, a decoder neural transformer model may be generated as follows. (Collectively, block 406).

The neural transformer model is trained on an unsupervised dataset that includes source code from different programming languages (i.e., multi-lingual). The pre-trained decoder neural transformer model predicts a sequence of tokens/subtokens, $m_t$, t=0 ... N, conditioned on an ordered sequence of tokens/subtokens $c_t$, t=0 ... T, corresponding to a context of code snippet C as the product of conditional probabilities by estimating a conditional probability distribution P(Output|Input) as follows:

$P(m_0, m_1, \ldots, m_N | c_0, c_1, \ldots, c_T) = \pi_{i=1}^{N} P(m_i | c_0, c_1, \ldots, c_T, m_0, m_1, \ldots, m_{i-1})$. The pre-trained decoder neural transformer model is trained to estimate this probability distribution for a source code corpus using an unsupervised autoregressive (AR) technique. The modeling objective is to maximize the following likelihood:

$\Sigma_i \log m_i | c_0, c_1, \ldots, c_T, m_{i-k+1}, \ldots, m_{i-1}; \Theta)$, where k is the size of the context window, and the conditional probability P is modeled using a neural transformer model with hyperparameters $\Theta$. The hyperparameters may include attention lengths, the number of attention heads, the number of decoder blocks, embedding dimensions, embedding matrices, and the number of hidden units per layer which are trained using a stochastic gradient descent optimization procedure.

The multi-layer decoder-only neural transformer model with attention produces an output distribution over the tokens/subtokens as follows:

$h_0 = U \cdot We + Wp$, $h_l$ = transformer block($h_l$-1), $l=1 \ldots n$, $P(C) = \text{softmax}(h_n \cdot W_e^T)$, where $C = c_{-k}, c_{-k+1}, \ldots, c_{-1}$ is the context vector of tokens/subtokens, n is the number of layers, T is the ordered sequence length, We is the token/subtoken embedding matrix and Wp is the position embedding matrix, e represents an embedding for a token/subtoken in the vocabulary, and p represents an embedding for a position of a token/subtoken. (Collectively, block 406).

The pre-trained encoder neural transformer model is then fine-tuned with the first fine-tuning dataset as a classifier to learn to predict the command name of a command that follows a set of lines of CLI code (block 408). The pre-trained decoder neural transformer model is then fine-tuned on the second fine-tuning dataset to learn to predict a parameter string to complete a line of CLI code given a command name and a context (block 410).

Figure 6:
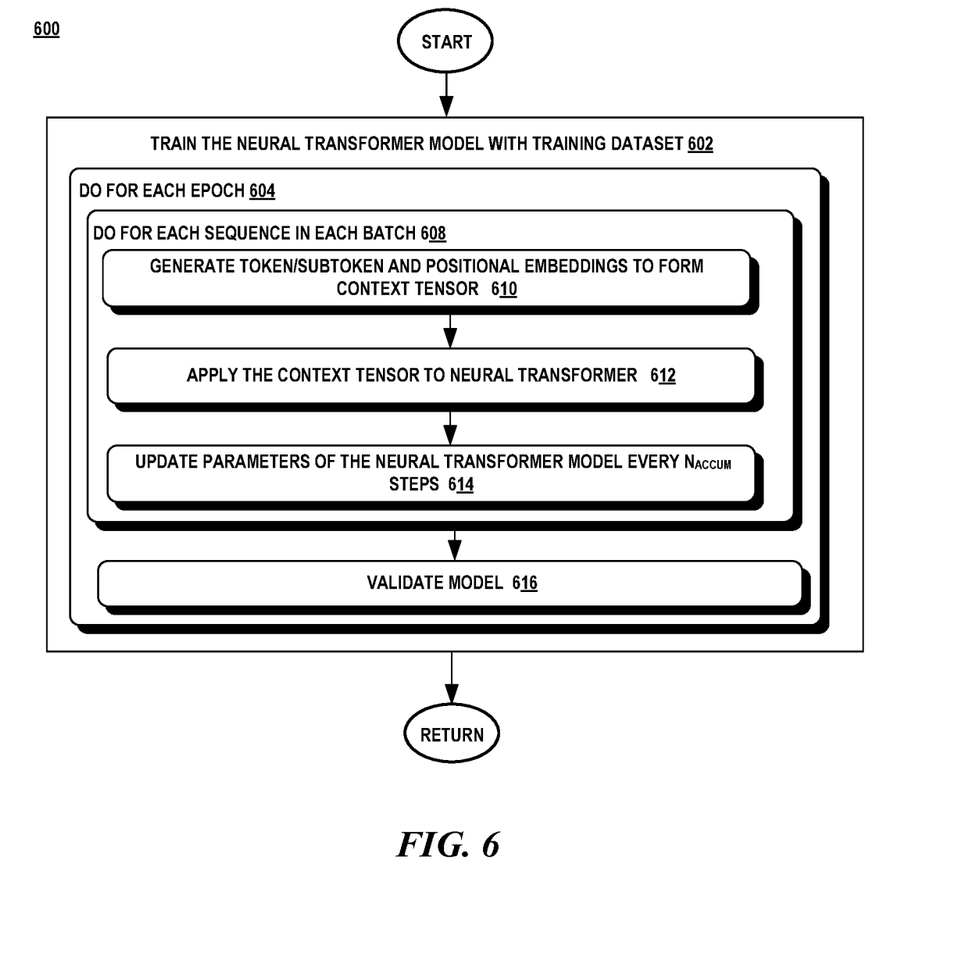
FIG. 6 is a flow diagram illustrating an example of a method of training a neural transformer model with attention with a training dataset.

FIG. 6 illustrates the process 600 to fine-tune both neural transformer models. Additionally, process 600 may also be used to pre-train an encoder neural transformer model and/or the decoder neural transformer model if this training is needed. It should be noted that each model is trained and fine-tuned separately.

Turning to FIG. 6, neural transformer models are trained iteratively, making multiple passes over the training dataset before converging to a minimum. An epoch represents the entire training dataset passed forwards and backwards through the neural transformer block once. Since the training dataset is very large, it is partitioned into smaller batches. The training is iterative and the entire dataset is passed through the neural transformer in multiple iterations. Each training iteration includes forward propagation, loss calculation, backpropagation steps followed by updating the weights. The training dataset is partitioned into batches with each batch of sequences running through the training process. (Collectively, block 602).

The neural transformer model has multiple blocks and layers within each block so that more detailed relationships within the data are learned as well as how the features interact with each other on a non-linear level. The model architecture, training procedure, data normalization and vocabulary encoding procedures are hyperparameters that are tailored to meet a particular objective. The parameters of a model are the values of the model, such as the weights and biases (e.g., K, V), the token embeddings, We, and the positional embeddings Wp. The hyperparameters influence the way the model is built and how the parameters are learned. (Collectively, block 604).

In one aspect, the hyperparameters of a pre-trained encoder neural transformer model may include the following: (1) subtoken and position embedding layers of dimensions: 30000×768, and 1024×768 respectively; (2) the configuration of the neural transformer model in a particular configuration with a number of encoder blocks; (3) for the training procedure: denoising auto-encoder, with a cross-entropy loss optimization objective; the sequence length of 1024 symbols; a mini-batch size of 8; the gradient accumulation steps for each weight update is 8; the Adam stochastic optimization procedure is used to train the feed forward neural network; and the learning rate is 0.0001; and (4) the vocabulary encoding procedure: byte-level byte-pair encoding, preserve the ten most frequent string and numerical literals encoding them as a single token during byte-level byte-pair encoding procedure; and introduce special control flow tokens to denote end-of-line, end-of-file, end-of-method, dedent, and indent symbols. (Collectively, block 604).

In one aspect, the hyperparameters of a pre-trained decoder neural transformer model may include the following: (1) subtoken and position embedding layers of dimensions: 30000×768, and 1024×768 respectively; (2) the configuration of the neural transformer model in a particular configuration with a number of decoder blocks; (3) for the training procedure: denoising auto-encoder, with a cross-entropy loss optimization objective; the sequence length of 1024 symbols; a mini-batch size of 8; the gradient accumulation steps for each weight update is 8; the Adam stochastic optimization procedure is used to train the feed forward neural network; and the learning rate is 0.0001; and (4) the vocabulary encoding procedure: byte-level byte-pair encoding, preserve the ten most frequent string and numerical literals encoding them as a single token during byte-level byte-pair encoding procedure; and introduce special control flow tokens to denote end-of-line, start-of-snippet, end-of-snippet, dedent, and indent symbols. (Collectively, block 604).

For each sequence of each batch in each epoch (blocks 608, 610), the T-ordered sequences of tokens/subtokens are then mapped into numeric vectors and then into respective subtoken embeddings and positional embeddings (block 610). An embedding is a learned representation for the text-based tokens/subtokens where tokens/subtokens that have a common meaning have a common representation. An embedding is a mapping of discrete categorical variables to a vector of continuous numbers. There is an embedding for each subtoken in the vocabulary and a corresponding positional embedding. The subtoken embedding represents the learned representation for the subtoken. The neural transformer model does not read each subtoken sequentially and as such, has no knowledge of the subtoken's position in a sequence without additional position information. The positional embedding is used to embed position information about a subtoken's position in a sequence into a respective neural transformer model.

Initial values are generated for the subtoken embedding and positional embeddings of each sequence which are then used to form a context tensor. Thereafter, the neural transformer model learns the values for each embedding. Upon the completion of the training phase, the embeddings for each subtoken and the positional embeddings are saved into respective matrices for later use. There is a subtoken embedding matrix, We, that contains an embedding vector for each subtoken $t_i$, i=0 . . . V, and a positional embedding matrix, Wp, that contains an embedding vector $P_j$, j=0 . . . T, for each position, where V is the size of the vocabulary and T is the length of the subtoken sequence. (Collectively, block 610).

The context tensor is input into a respective neural transformer model and passed through the multiple layers of the neural transformer model. For the encoder neural transformer model, the multi-head self-attention layer takes the context tensor as input and passes it through the multiple layers of multi-head attention, layer normalization and feed forward neural network of each encoder block to finally produce a set of hidden representations. For the decoder neural transformer model, the masked self-attention layer takes the context tensor as input and passes it through the multiple layers of multi-head attention, layer normalization and feed forward neural network of each decoder block to finally produce a set of hidden representations. (Collectively, block 612).

The decoder blocks of the neural transformer model take a shifted sequence of an output embedding as input. The masking in the masked multi-head attention layer is used to prevent positions from attending to subsequent positions in the future. The masking combined with the output embeddings shifted by one position ensures that the predictions to position T depend only on the known outputs at positions less than T. Starting with the first token of the output sequence, the tokens/subtokens are passed through the self-attention and normalization layers and into feed-forward neural network. (Collectively, block 612).

The feed forward neural networks in the encoder blocks and the decoder blocks are trained iteratively, making multiple passes over the training dataset before converging to a minimum. Each training iteration includes forward propagation, loss calculation, backpropagation steps followed by updating the weights by calculating the weight gradients. The loss function estimates the loss or error which is used to compare how good or bad the predicted results are. In one aspect, a categorical cross-entropy loss function is used. Once the loss is calculated, it is propagated backwards to the hidden layer that contributed directly to the output. In backpropagation, the partial derivatives of the loss function with respect to the trainable parameters are determined. The weight gradients are calculated as the difference between the old values and the new values of the weights. The weights are adjusted to make the loss as small as possible using a gradient descent technique. In one aspect, a Stochastic Gradient Descent (SGD) method is the optimization algorithm used to find the values of parameters of the function that minimizes the loss function. A backpropagation algorithm may be used to update the weights. (Collectively, block 612).

At the completion of each batch, the parameters of a respective neural transformer model are updated at a pre-configured frequency denoted as Naccum. Naccum is a gradient accumulation frequency and in one aspect has a value of 8. The parameters include the subtoken embeddings and the positional embeddings which are stored in a respective embedding matrix. (Collectively, block 614).

Next, each neural transformer model is validated. Before a neural transformer model is trained and fine-tuned, a set of hyperparameters is selected randomly and then tuned to achieve a desired performance. The neural transformer model is tested using a validation dataset to determine the appropriate hyperparameters settings to achieve a desired goal. When the desired goal is not achieved, one or more hyperparameters are adjusted and the training is repeated until the target goal is achieved. Perplexity on the validation set is calculated to validate the performance of the model with respect to the learning the masked out original text. (Collectively, block 616).

Turning back to FIG. 4, upon completion of the training of the neural transformer models, the models are then deployed in a CLI code completion system (block 412).

Inference

Attention now turns to a description of an example of an inference process.

Figure 7:
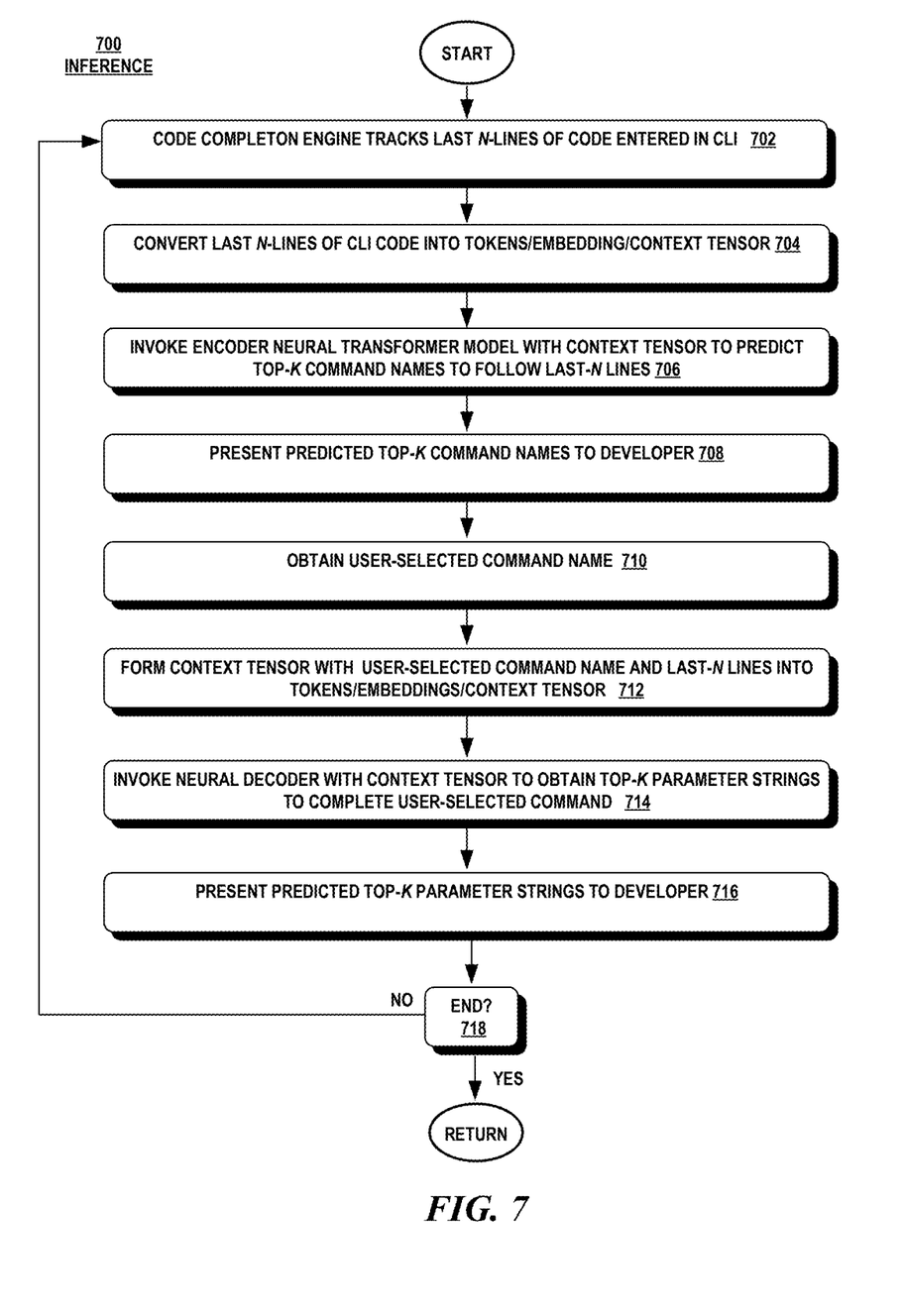
FIG. 7 is a flow diagram illustrating an example of a method of code completion using the encoder neural transformer model and the decoder neural transformer model.

Turning to FIG. 7, the code completion engine 110 tracks each line of CLI code entered into the CLI (block 702).

The code completion engine 110 converts the last n lines of source code entered into the CLI into a sequence of tokens and then into respective embeddings which are combined into a context tensor. The value of n is dependent on the number of lines used to form the fine-tuning dataset. The code completion engine parses the last n lines of source code into tokens and converts each token in a sequence into its corresponding embedding which has been previously computed from the fine-tuning of the encoder neural transformer model. The length of the input sequence is limited to a pre-configured number of tokens. (Collectively, block 704).

The code completion engine 110 invokes the fine-tuned encoder neural transformer model to obtain the top-k predicted command names of CLI commands having the highest probability to follow the last n lines of CLI code entered into the CLI. The fine-tuned encoder neural transformer model outputs a probability distribution of the model's vocabulary which includes each command name in the CLI. (Collectively, block 706).

The command names with the k highest probabilities are output to the developer (block 708). The developer may select one of the top-k predicted command names or enter a new command name (block 710). In either event, the user-designated command name and the last n lines of CLI code are converted into an input sequence of tokens and then into a sequence of input embeddings and positional embeddings, previously computed by the fine-tuning decoder neural transformer model to form a context tensor (block 712).

The code completion engine 110 invokes a beam search using the context tensor to find the top-k predicted parameter strings to complete the command name in a line of code. The prediction of the top-k parameter strings is performed using a beam search that invokes the decoder neural transformer model. (Collectively, block 714).

The decoder's computation at training time can be parallelized using masked self-attention but during inference, the tokens/subtokens are generated one token at a time. The neural transformer model factorizes the probability of the target tokens/subtokens in an input sequence into a product of conditional probabilities for each token/subtoken using the formula: $p(t_1, \ldots t_m|s) = \pi_{i=1}^m p(t_i|t_1, \ldots, t_{i-1}, s)$. During inference, the calculation of $\arg\max_t p(t|s)$ is complex and extremely time consuming making the model useless for real-time applications. Beam search is an approximation algorithm that performs faster. (Collectively, block 714).

The beam search uses the probability distribution generated by the decoder neural transformer model to identify the top k tokens/subtokens likely to be the next token/subtoken in a candidate sequence. An embedding vector for each token/subtoken in a sequence is obtained from the token/subtoken embedding matrix and its corresponding positional vector from the positional embedding matrix which are combined to form a context tensor. The context tensor is applied to the first decoder block of the decoder transformer model. (Collectively, block 714).

The last decoder block outputs a vector of floating-point numbers that is projected by the linear layer into unnormalized predictions or logits $V_0 \ldots V_{|V|}$. The logits are normalized using the softmax function to generate the softmax prediction $P_0 \ldots P_{|V|}$. (Collectively, block 714).

The beam search expands the search by instantiating new partial sequences using each of the selected tokens/subtokens identified by the decoder neural transformer model's probability distribution. The search continues generating new partial sequences from the top k tokens/subtokens identified by the output distributions from the decoder neural transformer model until the search ends. The search may end when the end-of-line token/subtoken appears as the most probable next token/subtoken. (Collectively, block 714).

A beam search uses a breadth-first search to build a search tree. The search tree is composed of nodes at one or more inference levels. Each node represents a probability distribution generated by the decoder neural transformer model for the tokens/subtokens in the model vocabulary. At each level, only the top k tokens/subtokens having the highest probabilities from the output distribution generated by the decoder neural transformer model are expanded to the next inference level. The variable k is preconfigured and referred to as the beam width. Each of the k tokens/subtokens is then expanded into a search that updates the current context sequence with the selected token/subtoken to input into the decoder neural transformer model to generate an additional probability distribution for the next token/subtoken in a sequence. This process is repeated until the end of a line token is predicted as being the next likely token/subtoken candidate. (Collectively, block 714).

The code completion engine 110 presents the predicted top-k parameter strings to the developer. The developer may accept one of the predicted parameters strings which is entered into the CLI. (Collectively, block 716).

The inference process (blocks 702-718-yes) repeats until there are no further lines of code entered into the CLI (block 718-no)

Exemplary Operating Environment

Figure 8:
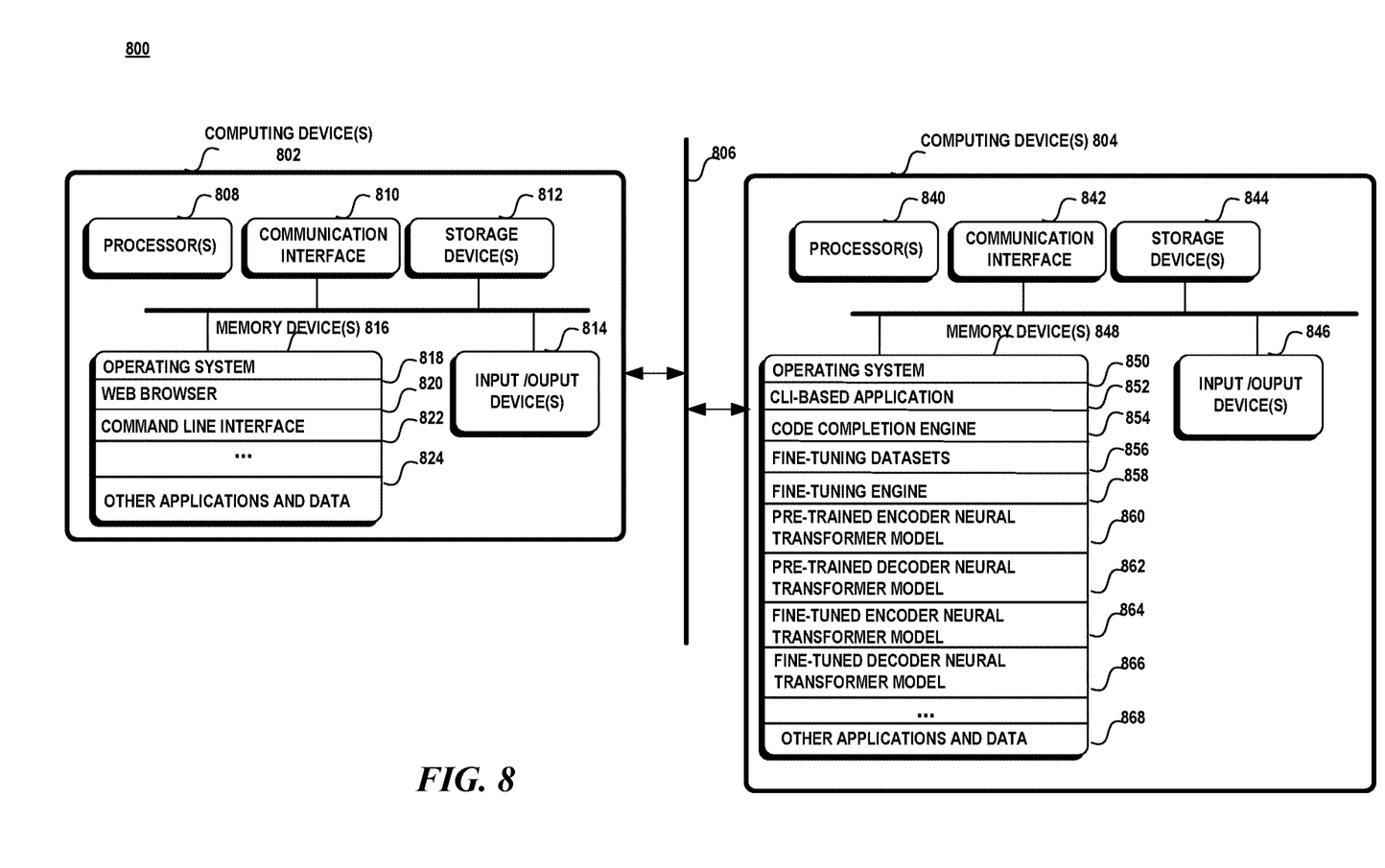

Attention now turns to a discussion of an exemplary operating environment 800. FIG. 8 illustrates an example of an operating environment 800 in which a first computing device 802 interacts with a second computing device 804, through a network 806. In one aspect, the first computing device 802 may be associated with a user that interfaces with a cloud service consisting of one or more computing devices 804. However, it should be noted that the aspects disclosed herein is not constrained to any particular configuration of devices. It should be noted that the operating environment is not limited to any particular configuration and other configurations are possible.

The computing devices 802, 804 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 800 may be configured in a network environment, a distributed environment, a multi-processor environment, or a stand-alone computing device having access to remote or local storage devices.

The computing devices 802, 804 may include one or more processors 808, 840, one or more communication interfaces 810, 842, one or more storage devices 812, 844, one or more input/output devices 814, 846, and one or more memory devices 816, 848. A processor 808, 840 may be any commercially available or customized processor and may include dual microprocessors and multi-processor architectures. A communication interface 810, 842 facilitates wired or wireless communications between the computing device 802, 804 and other devices. A storage device 812, 844 may be computer-readable medium that does not contain propagating signals, such as modulated data signals transmitted through a carrier wave. Examples of a storage device 812, 844 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 812, 844 in the computing devices 802, 804. The input/output devices 814, 846 may include a keyboard, mouse, pen, voice input device, touch input device, display, speakers, printers, etc., and any combination thereof.

A memory device or memory 816, 848 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory 816, 848 may also include one or more external storage devices or remotely located storage devices that do not pertain to propagated signals, such as modulated data signals transmitted through a carrier wave.

The memory device 848 of computing device 804 may contain instructions, components, and data. A component is a software program that performs a specific function and is otherwise known as a module, program, component, and/or application. The memory device 848 may include an operating system 850, a CLI-based application 852, a code completion engine 854, a fine-tuning dataset 856, a fine-tuning engine 858, a pre-trained encoder neural transformer model 860, a pre-trained decoder neural transformer model 862, a fine-tuned encoder neural transformer model 864, a fine-tuned decoder neural transformer model 866 and other applications and data 868.

The memory device 816 of the computing devices 802 may include an operating system 818, a web browser 820, a command line interface 822, and other applications and data 824.

The computing devices 802, 804 may be communicatively coupled via a network 806. The network 806 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

The network 806 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra-Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

Conclusion

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Operations for the aspects may be further described with reference to various examples of methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

For example, in an aspect, an entire line of CLI code including a command name, subcommand, and/or parameter string may be presented to the developer without displaying the k-predicted command names first and obtaining a user-selected command name from the k-predicted command names. The code completion system may invoke the decoder neural transformer model with each of the k-predicted command names to predict one or more parameter strings. The various combinations of each of the k-predicted command names with corresponding predicted parameter strings for a command name are then presented to the developer as a complete line of CLI code. The developer may then select one of the complete lines of CLI code to follow the preceding lines of CLI code.

A system is disclosed comprising: one or more processors; and a memory that stores one or more programs that are configured to be executed by the one or more processors, the one or more programs including instructions to perform actions to: track lines of command line interface (CLI) code entered into a user interface, wherein a line of CLI code includes a command name and a parameter string, the parameter string including zero, one or more parameters, a parameter having a parameter value; acquire n consecutive lines of CLI code from the user interface at a current position; obtain, from a first deep learning model, k predicted command names given the n lines of CLI code; retrieve a user-selected one of the k predicted command names; and obtain, from a second deep learning model, a parameter string given the user-selected command name and the n consecutive lines of CLI code, wherein the parameter string completes the selected command name into a syntactically-correct line of CLI code, wherein the first deep learning model and the second deep learning model differ.

In an aspect, the one or more programs include further instructions that: prior to obtain, from the first deep learning model, k predicted command names given the n lines of CLI code, provide the k predicted command names to the user interface. In an aspect, the one or more programs include further instructions that: provide the parameter string to the user interface. In an aspect, the n lines of CLI code are based on a number of lines of CLI code used to train the first deep learning model and/or the second deep learning model. In an aspect, the first deep learning model is based on a pre-trained encoder model having been trained on an unsupervised training dataset of source code programs from different programming languages using a masked language objective and fine-tuned on a supervised training dataset of CLI code snippets.

In an aspect, the second deep learning model is based on a pre-trained decoder model having been trained on an unsupervised training dataset of source code programs from different programming languages and fine-tuned on a supervised training dataset of CLI code snippets. In an aspect, the first deep learning model is an encoder-only neural transformer model with attention. In an aspect, the second learning model is a decoder-only neural transformer model with attention.

A method is disclosed, comprising: obtaining a first pre-trained deep learning model trained to learn to predict encodings of source code tokens from source code programs written in different programming languages using a mask language objective; fine-tuning the first pre-trained deep learning model into a classifier that predicts a command name of a command of a command language interface (CLI) that follows a set of CLI lines of code; obtaining a second pre-trained deep learning model trained to learn to predict tokens that complete a line of source code based on a conditional probability distribution; and fine-tuning the second pre-trained deep learning model to learn to predict a parameter string that corresponds to a command name given the set of CLI lines of code.

In an aspect, the computer-implemented method further comprises: generating a first fine-tuning dataset including a CLI source code snippet and a command name of a command in a line of CLI code that immediately follows the CLI source code snippet, wherein the first fine-tuning dataset is used to fine-tune the first pre-trained deep learning model.

In an aspect, the Ultra-Wide CLI source code snippet includes n consecutive lines of CLI code extracted from usage telemetry data. In an aspect, the method further comprises: generating a second fine-tuning dataset including a CLI source code snippet and a true next line of code, wherein the second fine-tuning dataset is used to fine-tune the second pre-trained deep learning model.

In an aspect, the CLI source code snippet includes n consecutive lines of CLI code extracted from usage telemetry data. In an aspect, the first pre-trained deep learning model is an encoder neural transformer model with attention. In an aspect, the second pre-trained deep learning model is a decoder neural transformer model with attention.

A device is disclosed comprising: a processor and a memory. The processor is configured to perform actions that: track lines of command line interface (CLI) code entered into a CLI, wherein a line of CLI code includes a command name followed by zero, one or more parameter strings; predict a command name to follow a set of previous lines of CLI code entered into the CLI using a first deep learning model, wherein the first deep learning model predicts the command name based on the set of previous lines of CLI code; predict a parameter string to follow the command name using a second deep learning model, wherein the second deep learning model predicts the parameter string based on the predicted command name and the set of previous lines of CLI code entered into the CLI; and output the predicted command name and predicted parameter string to the CLI.

In an aspect, the first deep learning model is generated from a pre-trained encoder model trained on an unsupervised dataset of source code snippets from a plurality of programming languages using a span masking objective and fine-tuned as a classifier using a supervised dataset of CLI code snippets to predict the command name.

In an aspect, the second deep learning model is generated from a pre-trained decoder model trained on an unsupervised dataset of source code snippets from a plurality of programming language using a conditional probability objective and fine-tuned on a supervised dataset of CLI code snippets.

In an aspect, the first deep learning model is an encoder-only neural transformer model with attention. In an aspect, the second deep learning model is a decoder-only neural transformer model with attention.

What is claimed:

1. A system comprising:
one or more processors; and
a memory that stores one or more programs that are configured to be executed by the one or more processors, the one or more programs including instructions to perform actions to:
track lines of command line interface (CLI) code entered into a user interface, wherein a line of CLI code comprises a command name and a parameter string, wherein the parameter string comprises including zero or one or more parameters, wherein a parameter comprises a parameter value;
acquire n consecutive lines of CLI code from the user interface immediately preceding a current position in the user interface;
cause a first deep learning model to generate k model-generated command names given the n consecutive lines of CLI code;
present the k model-generated command names in the user interface;
retrieve a user-selected one of the k model-generated command names;
cause a second deep learning model to generate a parameter string given the user-selected command name and the n consecutive lines of CLI code, wherein the parameter string completes the user-selected command name into a syntactically-correct line of CLI code, wherein the first deep learning model and the second deep learning model differ;
output the user-selected command name and the model-generated parameter string as a syntactically-correct line of CLI code; and
upon user selection of the syntactically-correct line of CLI code, input the syntactically-correct line of CLI code into the CLI.

2. The system of claim 1, wherein the syntactically-correct line of CLI code spans several physical lines in the CLI.

3. The system of claim 1, wherein the n consecutive lines of CLI code are based on a number of lines of CLI code used to train the first deep learning model and/or the second deep learning model.

4. The system of claim 1, wherein the first deep learning model is based on a pre-trained encoder model having been trained on an unsupervised training dataset of source code programs from different programming languages using a masked language objective and fine-tuned on a supervised training dataset of CLI code snippets.

5. The system of claim 1, wherein the second deep learning model is based on a pre-trained decoder model having been trained on an unsupervised training dataset of source code programs from different programming languages and fine-tuned on a supervised training dataset of CLI code snippets.

6. The system of claim 1, wherein the first deep learning model is an encoder-only neural transformer model with attention.

7. The system of claim 1, wherein the second deep learning model is a decoder-only neural transformer model with attention.

8. A hardware storage device having stored thereon computer executable instructions that are structured to be executable by a processor of a computing device to thereby cause the computing device to perform actions that:
track lines of command line interface (CLI) code entered into a CLI, wherein a line of CLI code comprises a command name followed by zero or one or more parameter strings;

cause a first deep learning model to generate a model-generated command name to follow a set of previous lines of CLI code entered into the CLI given the set of previous lines of CLI code;
output the model-generated command name in a user interface;
upon user input selecting the model-generated command name, cause a second deep learning model to generate a model-generated parameter string to follow the model-generated command name given the model-generated command name and the set of previous lines of CLI code entered into the CLI;
output the predicted command name and predicted parameter string as a syntactically-correct line of CLI code; and
upon user input selecting the syntactically-correct line of CLI code, input the syntactically-correct line of CLI code into the CLI.

9. The hardware storage device of claim 8, wherein the first deep learning model is generated from a pre-trained encoder model trained on an unsupervised dataset of source code snippets from a plurality of programming languages using a span masking objective and fine-tuned as a classifier using a supervised dataset of CLI code snippets to predict the command name.

10. The hardware storage device of claim 8, wherein the second deep learning model is generated from a pre-trained decoder model trained on an unsupervised dataset of source code snippets from a plurality of programming language using a conditional probability objective and fine-tuned on a supervised dataset of CLI code snippets.

11. The hardware storage device of claim 8, wherein the first deep learning model is an encoder-only neural transformer model with attention.

12. The hardware storage device of claim 8, wherein the second deep learning model is a decoder-only neural transformer model with attention.

13. A computer-implemented method, comprising:
receiving last n lines of CLI code entered into the CLI;
causing a first deep learning model to generate k command names of CLI commands having a highest likelihood to follow the last n lines entered into the CLI as a syntactically-correct line of CLI code, wherein the deep learning model is given the last n lines of CLI code entered into the CLI;
outputting the k command names of the CLI commands to the CLI;
receiving a user selection of one of the k commands names of the CLI commands;
causing a second deep learning model to generate a parameter string to follow the user-selected one of the k command names given the user-selected one of the k command names;
presenting the user-selected command name and the parameter string as the syntactically-correct line of CLI code; and
upon user selection of the syntactically-correct line of CLI code, inputting the syntactically-correct line of CLI code into the CLI.

14. The computer-implemented method of claim 13, wherein the first deep learning model is pre-trained to generate the k command names to follow the last n lines of CLI code on an unsupervised dataset of source code snippets from a plurality of programming languages using a span masking objective.

15. The computer-implemented method of claim 14, wherein the pre-trained first deep learning model is fine-tuned on a supervised dataset of CLI code snippets to learn to generate a target command name.

16. The computer-implemented method of claim 13, wherein the n lines of CLI code are based on a number of lines of CLI code used to train the first deep learning model and/or the second deep learning model.

17. The computer-implemented method of claim 13, wherein the first deep learning model is an encoder-only neural transformer model with attention.

18. The computer-implemented method of claim 13, wherein the second deep learning model is based on a pre-trained decoder model having been trained on an unsupervised training dataset of source code programs from different programming languages.

19. The computer-implemented method of claim 18, wherein the second deep learning model is fine-tuned on a supervised training dataset of CLI code snippets.

20. The computer-implemented method of claim 13, wherein the second deep learning model is a decoder-only neural transformer model with attention.

* * * * *